US012025262B1

(12) United States Patent
Chiu et al.

(10) Patent No.: US 12,025,262 B1
(45) Date of Patent: Jul. 2, 2024

(54) INFORMATION HANDLING SYSTEM DISPLAY STAND MOUNT

(71) Applicant: Dell Products L.P., Round Rock, TX (US)

(72) Inventors: Cheng-Chia Chiu, Taipei (TW); Toh Kim Cheong, Singapore (SG); Chun-Han Ho, Taipei (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/182,462

(22) Filed: Mar. 13, 2023

(51) Int. Cl.
*E05B 73/00* (2006.01)
*F16M 11/04* (2006.01)
*F16M 11/22* (2006.01)
*G06F 1/18* (2006.01)

(52) U.S. Cl.
CPC ......... *F16M 11/22* (2013.01); *E05B 73/0082* (2013.01); *F16M 11/04* (2013.01); *G06F 1/181* (2013.01)

(58) Field of Classification Search
CPC .... F16M 11/22; F16M 11/04; E05B 73/0082; G06F 1/181
USPC ........ 248/552, 551, 917; 361/679.57, 679.58
See application file for complete search history.

(56) References Cited

U.S. PATENT DOCUMENTS

| | | | | |
|---|---|---|---|---|
| 10,524,369 | B2 * | 12/2019 | Chiu | F16M 11/046 |
| D883,297 | S * | 5/2020 | Latto | D14/447 |
| 10,860,066 | B1 * | 12/2020 | Barnard | F16M 11/041 |
| 10,999,518 | B1 * | 5/2021 | Lavallo | H04N 23/51 |
| 11,480,995 | B2 * | 10/2022 | Choi | G06F 1/166 |
| 11,732,511 | B1 * | 8/2023 | Lim | G06F 1/1607 |
| | | | | 248/552 |

OTHER PUBLICATIONS

Lenovo, Detailed Specifications for ThinkCentre Tiny-in-One 23 (TIO) (23" Tiny Systems), downloaded from https://support.lenovo.com/us/en/solutions/pd100322-detailed-specifications-for-thinkcentre-tiny-in-one-23-tio-23-tiny-in-one-systems on Mar. 13, 2023, 4 pages.
HP, "HP Integrated Work Center for Desktop Mini and Thin Client," downloaded from https://www.hp.com/us-en/shop/bdp/hp-integrated-work-center-for-desktop-mini-and-thin-client-p-g1v61at-1 on Mar. 13, 2023, 4 pages.
Dell, "Dell—Desktop to monitor mounting kit—for Precision 3240 Compact," downloaded from https://www.newegg.com/p/1W8-005X-003T2?item=9SIBFBFJBP1500&nm_mc=knc-googleadwords&cm_mmc=knc-googleadwords-_-accessories%20-%20case%20%2F%20rackmount-_-dell-_-9SIBFBFJBP1500&source=region&srsltid=Ad5pg_FM_p8x5dzlKgchfLmn3szBB3tudejOoYzsm6tnFyldliZxHUmnlto on Mar. 13, 2023, 4 pages.
Dell, "Dell All-in-One VESA Mount for E-Series Monitors with Base Extender.—MFF/TC," downloaded from https://www.dell.com/en-us/shop/dell-all-in-one-vesa-mount-for-e-series-monitors-with-base-extender-mff-tc/apd/452-bdvb/pc-accessories on Mar. 13, 2023, 5 pages.

* cited by examiner

*Primary Examiner* — Todd M Epps
(74) *Attorney, Agent, or Firm* — ZAGORIN CAVE LLP; Robert W. Holland

(57) ABSTRACT

A display stand having an opening in a vertical riser arm couples a display at a front side and selectively couples with an information handling system housing mount in the opening that supports a bracket to couple with an information handling system housing opposite to and at a rear side of the display. The mount fits a member at a bottom side into a cavity of the riser opening and a catch of a latch at an upper side of the riser opening with a toolless coupling a decoupling arrangement.

20 Claims, 6 Drawing Sheets

INFORMATION HANDLING SYSTEM DISPLAY STAND MOUNT

BACKGROUND OF THE INVENTION

Field of the Invention

The present invention relates in general to the field of information handling systems, and more particularly to an information handling system display stand mount.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems generally integrate processing components that cooperate to process information in response to end user inputs and present the information output as visual images at a display. For example, a central processing unit (CPU) and random access memory (RAM) couple to a motherboard to execute instructions of an operating system and applications based upon end user inputs to a keyboard and mouse. A graphics processing unit (GPU) further processes the information to generate pixel values that define visual images as output at a peripheral display, such as liquid crystal display (LCD) held in a viewing position by a display stand. Typically, the information handling system interfaces with the display through a graphics cable, such as an HDMI, DisplayPort or USB Type C cable. In addition, both the display and the information handling system will typically have a power cable that couples to a wall power socket. Other peripheral devices may also interface with the information handling system and/or display by cables, such as a keyboard and a mouse, although low bandwidth wireless interfaces like BLUETOOTH are commonly used instead of peripheral cables.

One difficulty with the use of desktop information handling systems is that the information handling system can rest in a location that creates clutter in a desktop area. The desktop clutter is worsened when cables that support information handling system and display operations are spread around. To manage clutter, information handling systems and displays often rely on cable management systems to route cables between the display and the system as well as with other peripherals and external power. One common technique is to route peripheral cables and display cables through an opening in a display stand. Another technique is to power the display from a desktop information handling system electrical socket so that the display power and graphics cables both route from the information handling system to the display in the same manner. Another approach is to mount the desktop information handling system on the display stand at a rear side of the display stand so that cables between the information handling system and display are kept short and only a single assembly is disposed on the desktop, thereby reducing clutter. One display stand mount available from DELL INC. has a bracket that inserts through an opening of the display stand from the rear and is held in place by a piece coupled at the opening from the front so the bracket is captured in the display stand opening. One difficulty with this approach is that the assembly and disassembly of the bracket is cumbersome and can be difficult when a display is coupled to the display stand front side. For example, an end user typically has to have access to both a front and rear of the display stand to attach and remove the bracket. In some instances, the end user will need tools to attach and remove the bracket.

SUMMARY OF THE INVENTION

Therefore, a need has arisen for a system and method which supports toolless engagement of an information handling system mount to a display stand.

In accordance with the present invention, a system and method are provided which substantially reduce the disadvantages and problems associated with previous methods and systems for coupling an information handling system to a display stand. An information handling system mount couples in a display stand vertical riser opening by engaging a member in a lower cavity to capture the mount vertically and engaging a release latch catch under a catch lip to capture the mount horizontally.

More specifically, an information handling system processes information with processing components disposed in a housing, such as a central processing unit that executes instructions to process information that interfaces with a memory that stores the instructions and information. The information handling system couples to a bracket of an information handling system mount that in turn couples to a display stand. The display stand has a base that rests on a support surface and a vertical riser extending up from the base and terminating with a display bracket that couples to a display. The vertical riser has an opening between a rear and front side that accepts the information handling system mount. A metallic bracket brace and information handling system bracket are captured within a stand support that is sized to fit into the vertical riser opening. A member extends from the information handling system mount into a cavity at a lower end of the vertical riser opening. The member engages in the cavity to prevent vertical movement of the mount. A release latch extends a catch into the vertical riser opening to engage a catch lip that prevents horizontal movement of the mount. The information handling system bracket extends up vertically from the stand support to hold the information handling system at a rear side of the display stand. The information handling system mount is removed from the display stand by pressing down on the release latch so that the catch releases from the catch lip within the vertical riser opening to free the member to slide horizontally out of the cavity of the vertical riser opening.

The present invention provides a number of important technical advantages. One example of an important technical advantage is that an information handling system mount couples to a display stand vertical riser opening in a toolless manner by engaging a member in a cavity and holding the member in the cavity with a latch. The mount assembles and disassembles to the display stand with an inward press and insertion of the latch under a catch formed in the vertical riser opening. A secure and robust coupling of the information handling system is supported by a metal central brace enclosed in the stand support.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system mounts to a display stand with a mount that inserts into an opening of the display stand riser in a toolless manner. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
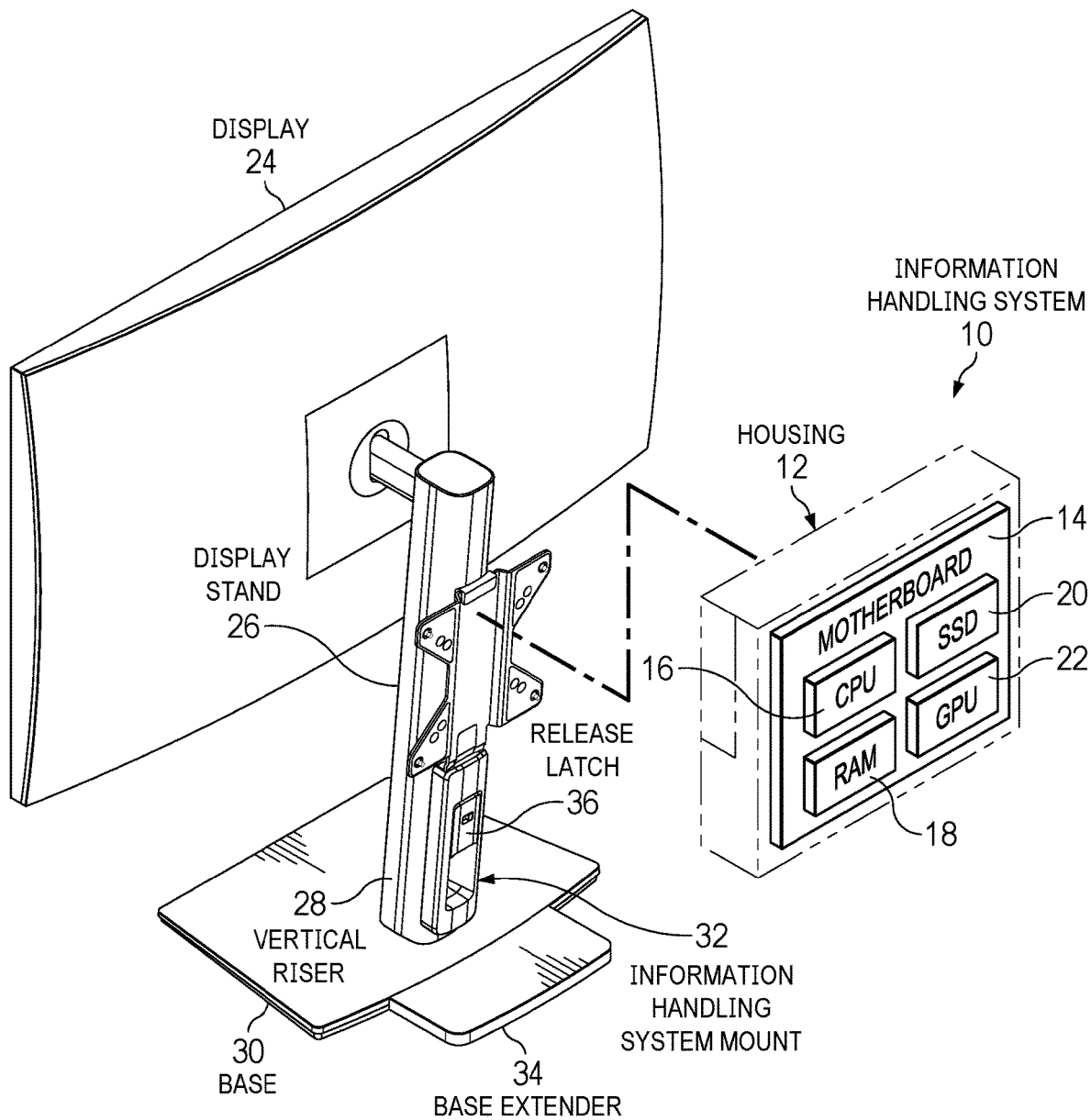
FIG. 1 depicts an information handling system coupled at a rear side of a display stand with a mount inserted in an opening of a riser of the display stand.

Referring now to FIG. 1, an information handling system 10 couples at a rear side of a display stand 26 with an information handling system mount 32 inserted in an opening of a vertical riser 28 of the display stand. In the example embodiment, information handling system 10 has a housing 12 that couples to a bracket of the information handling system mount 32 with a VESA standard bracket arrangement of coupling devices, such a screws. Housing 12 contains processing components that cooperate to process information for presentation at a display 24 as visual images. For instance, a motherboard 14 interfaces a central processing unit (CPU) 16 that executes instructions to process information with a random access memory (RAM) 18 that stores the instructions and information. A solid state drive (SSD) 20 provides persistent storage, such as flash memory that stores an operating system and applications. A graphics processing unit (GPU) 22 further processes information to generate pixel values that define visual images presented at display 24. In various embodiments, various arrangements of processing components may be used, although the configuration of processing components should fit in a housing 12 sized to couple to display stand 26 so that housing 12 is raised over the support surface on which display stand 26 rests.

Display stand 26 has a base 30 that rests on a support surface, such as a desktop surface, to hold display 24 in a raised viewing position having a display panel front surface facing an end user. Base 30 rests on the support surface and has a vertical riser 28 that extends upwards to termination in a VESA standard display bracket that couples with display 24. Vertical riser 28 has an opening defined between a front side and rear side that can pass a display cable from information handling system 10 to display 24 and that also provides a location at which information handling system mount 32 couples with a release latch 36 in a toolless manner. As is presented in greater detail below, information handling system mount 32 fits into the opening of vertical riser 28 with release latch 36 engaging the opening to hold a bracket onto which information handling system 10 couples. A downward press on release latch 36 decouples information handling system mount 32 from the opening of vertical riser 28 without the use of any tools. In the example embodiment, a base extender 34 couples to the bottom side of display stand base 30 to help offset the weight of information handling system 10, which can develop a rear side imbalance. Base extender 34 optionally couples in place at the bottom of base 30 when the display weight is relatively low and/or the information handling system weight is relatively high.

Figure 2:
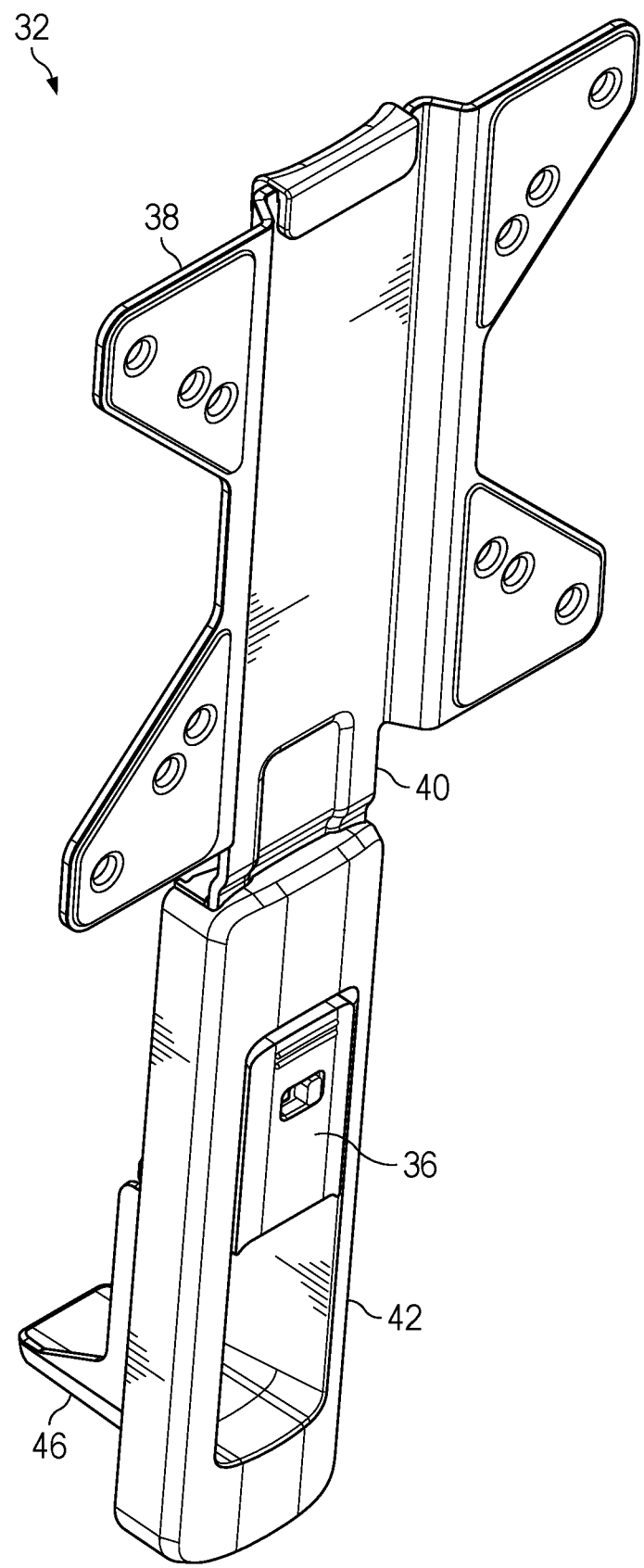
FIG. 2 depicts a rear perspective view of the information handling system mount separate from the display stand and without an information handling system coupled in place.

Referring now to FIG. 2, a rear perspective view depicts information handling system mount 32 separate from the display stand and without an information handling system coupled in place. An information handling system bracket 38 terminates an upper end of a bracket brace 40 and has coupling openings with a VESA configuration that couples to an information handling system housing. In one example embodiment, information handling system bracket 38 and bracket brace 40 are pressed from a single piece of sheet metal, such as steel. Bracket brace 40 extends through a stand support 42 and terminates with a member 46 that extends into the display stand riser opening. For example, stand support 42 is an assembly of plastic parts around bracket brace 40 that support engagement and disengagement of release latch 36 within the display stand riser opening.

Figure 3:
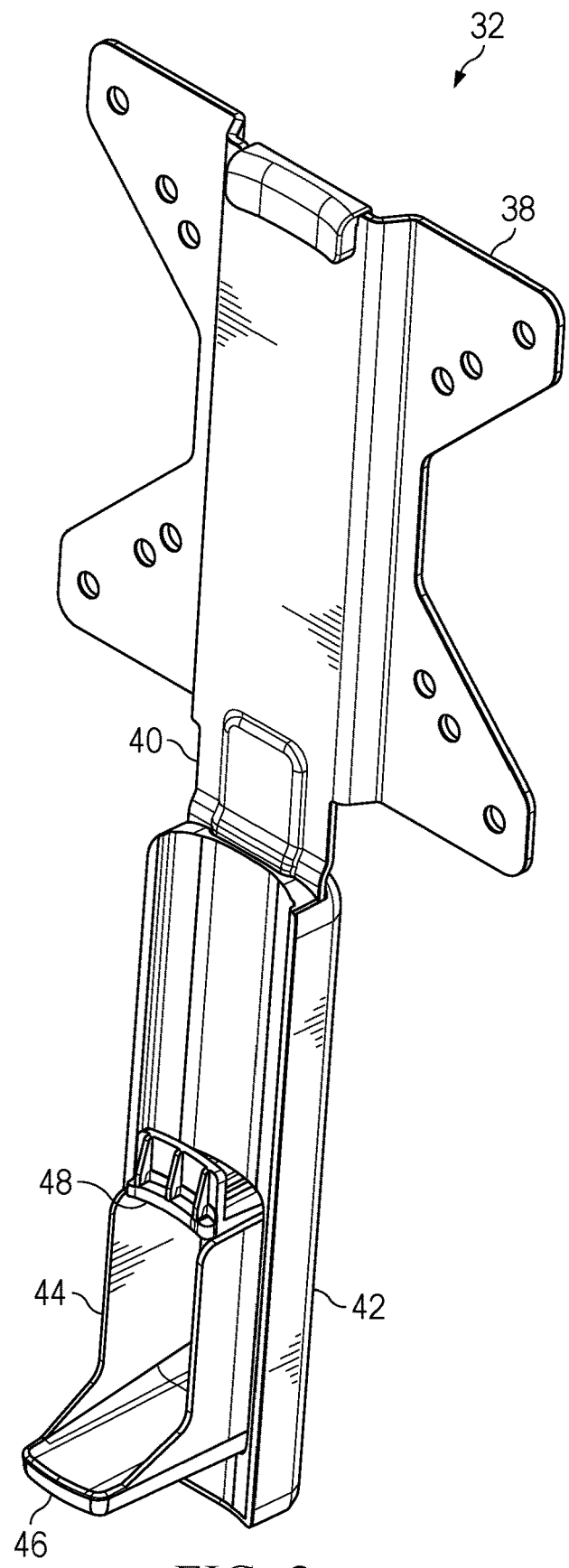
FIG. 3 depicts a front perspective view of the information handling system mount separate from the display stand and without an information handling system coupled in place.

Referring now to FIG. 3, a front perspective view depicts information handling system mount 32 separate from the display stand and without an information handling system coupled in place. Bracket brace 40 is a metallic piece captured within a plastic piece assembly of stand support 42. A catch 48 extends upward from stand support 42 to engage with a lip formed on the inside of the opening of the display stand vertical riser. An insert portion 44 forms an outer perimeter that engages against the sides of the vertical riser opening to help stabilize stand support 42 relative to the display stand. Member 46 extends into the opening of the vertical riser to engage under a lip formed in the opening. Stand support 42 couples to the vertical riser opening by first inserting member 46 under a lip within the opening and then activating the release latch to move catch 48 downwards and under the lip at the upper side of the vertical riser opening. Member 46 couples stand support 42 in place vertically while catch 48 engages to couple stand support in place horizontally. Removal of information handling system mount 32 is performed by pressing down on the release latch to disengage catch 48 and then sliding member 46 horizontally out of the vertical riser opening.

Figure 4:
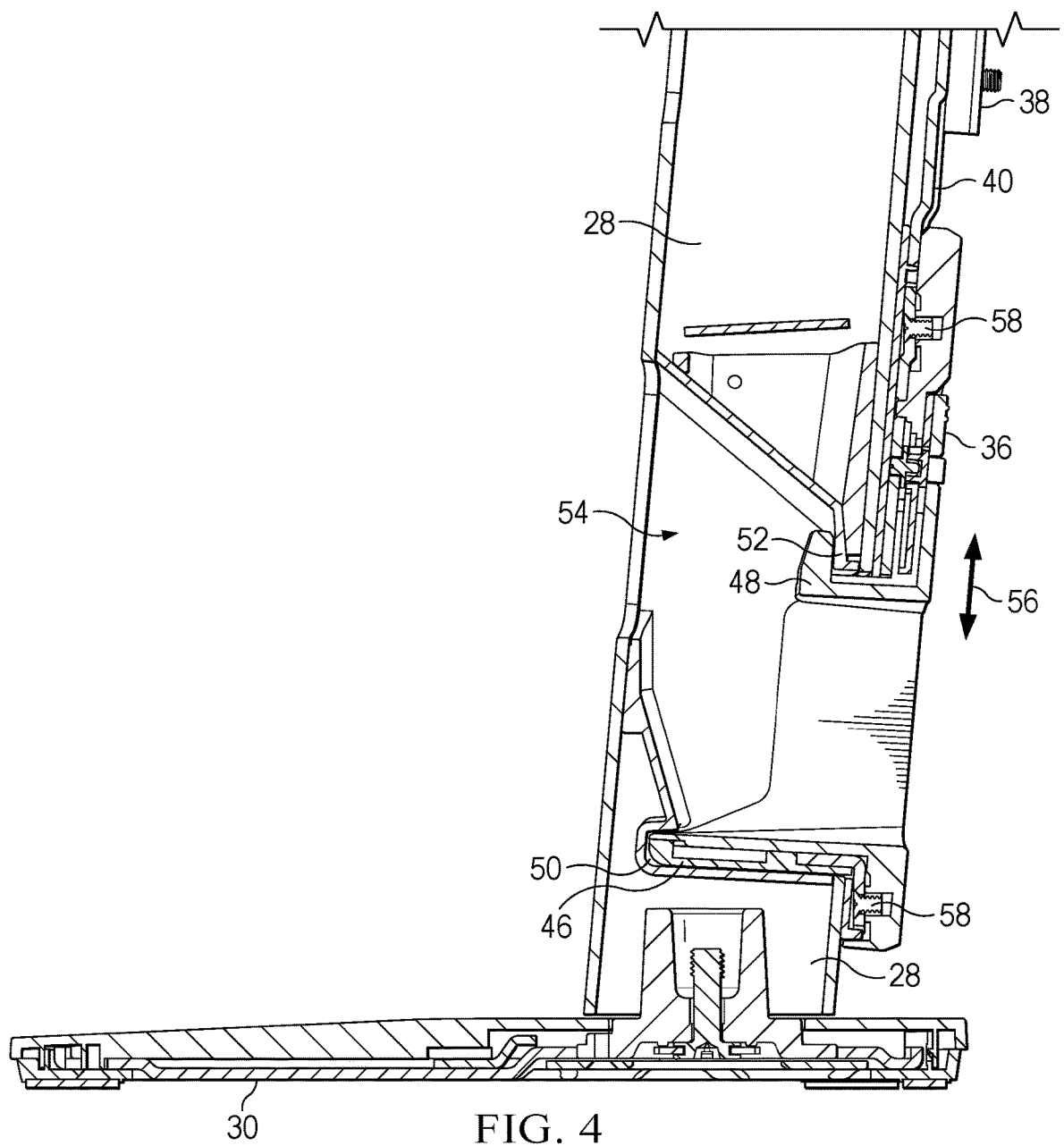
FIG. 4 depicts a side sectional view of the information handling system mount engaging the latch and member in the display stand vertical riser opening.

Referring now to FIG. 4, a side sectional view of the information handling system mount depicts engagement of the latch and member in the display stand vertical riser opening. In the example embodiment, information handling system bracket 38 and bracket brace 40 are pressed and punched from sheet metal, such as steel, with bracket brace 40 having an opening aligned with vertical riser 28 opening 54. Bracket brace 40 extends past opening 54 and is bent to form member 46 so that a central steel sheet metal piece reinforces the strength of the stand support that encloses member 46. Release latch 36 slides vertically as indicated by arrow 56 so that catch 48 engages with a catch lip 52 formed at the upper side of opening 54. A cavity 50 formed in the bottom side of opening 54 accepts member 46 proximate base 30. Engagement of member 46 in cavity 50 holds member 46 to prevent member 46 from detaching from the stand riser opening 54 when catch 48 is not locked. The plastic stand support assembly couples to bracket brace 40 with screws 58.

Figure 5:
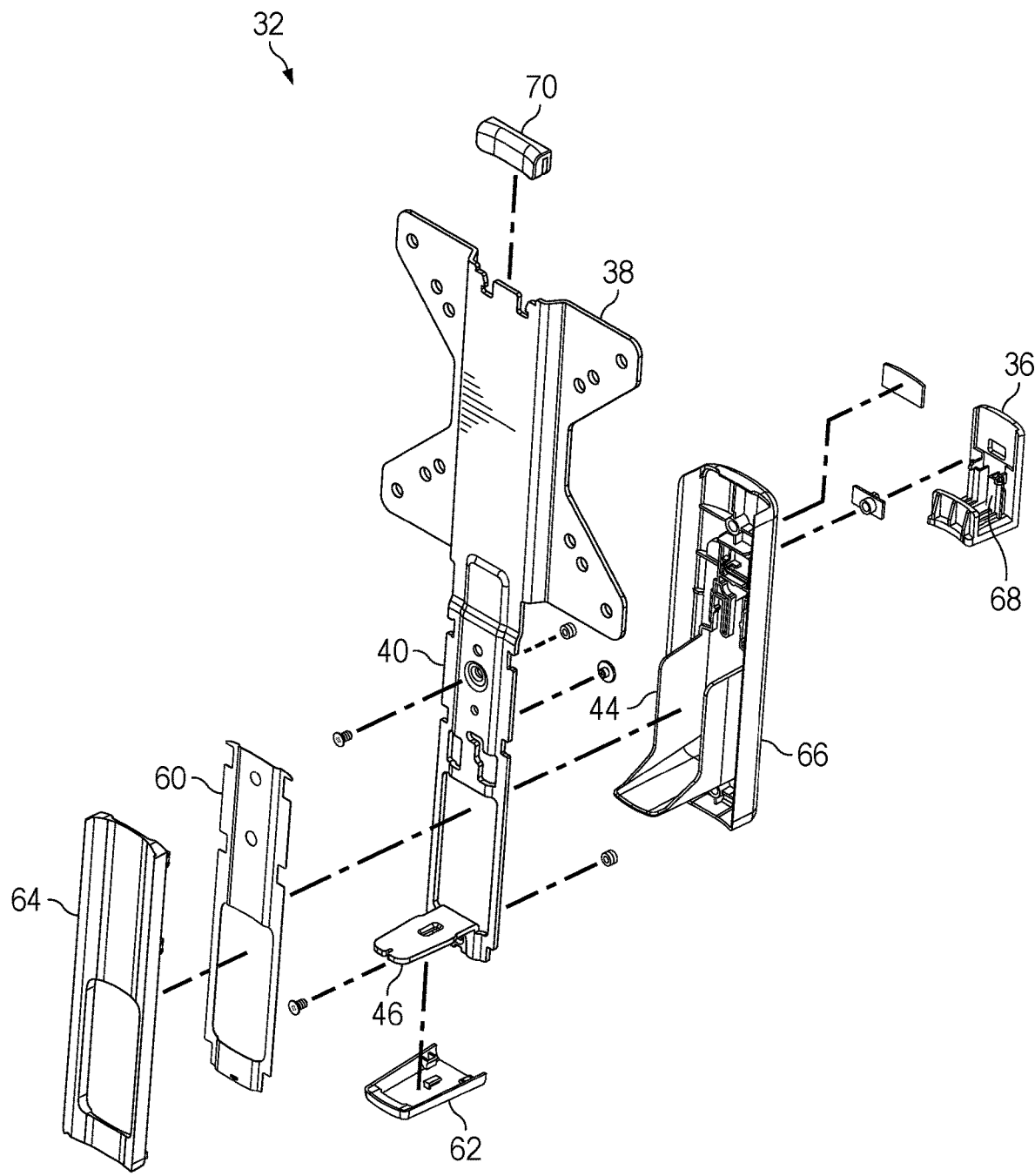
FIG. 5 depicts an exploded front view of the information handling system mount.

Referring now to FIG. 5, an exploded front view depicts the information handling system mount 32. In the example embodiment, information handling system bracket 38 and bracket brace 40 are machined by pressing and punching sheet metal, including a cut portion to form an opening and to bend into the member 46. A bumper 70, such as a rubber injection molded piece with a slot, couples to the top side information handling system bracket 38 to dampen vibrations between the display stand and information handling system. A plastic front outer portion 64 couples an inner sheet metal portion 60 in place against bracket brace 40. A lower plastic cover 62 engages against the bottom side of member 46 and couples with insert portion 44 to encapsulate member 46 within a plastic structure. Plastic rear outer portion 66 couples to the front outer portion 64 to enclose bracket brace 40 and secure the assembled stand support in place, including release latch 36. A biasing device 68, such as a spring, biases release latch 36 in an upward direction so that the release latch couples within the display stand vertical riser opening. The plastic portions that form the support stand fit around the metal brace and couple together with screws so that the metal inner structure reinforces the assembly.

Figure 6:
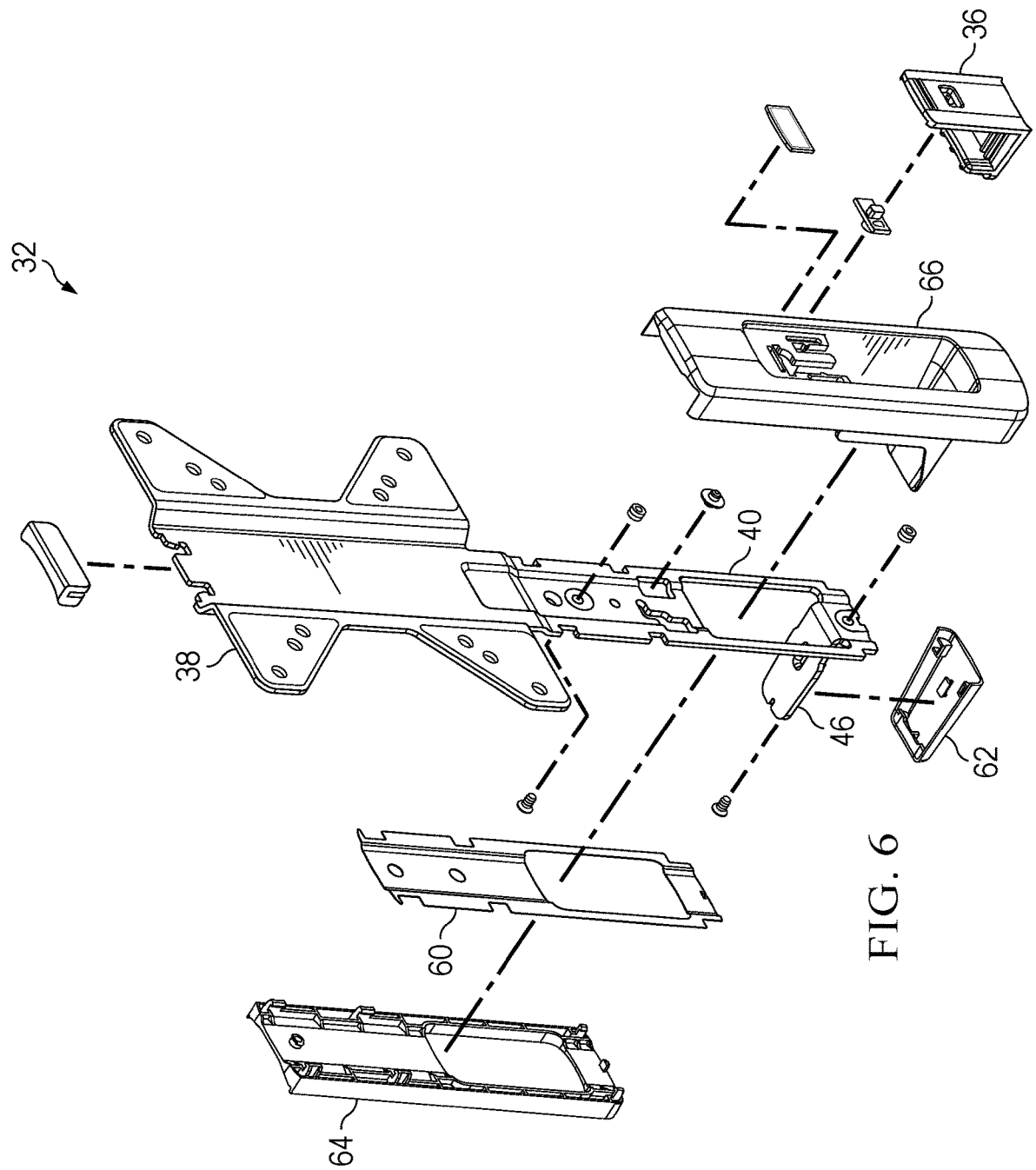
FIG. 6 depicts an exploded rear view of the information handling system mount.

Referring now to FIG. 6, an exploded rear view depicts the information handling system mount. Latch 36 fits within the opening of rear outer portion 66 to slide vertically. Rear outer portion 66 couples around bracket brace 40 to have the insert portion rest over member 46. Inner sheet metal portion 60 is captured at the front side of bracket brace 40 by front outer portion 64 to complete the enclosure of bracket brace 40 by the stand support. Lower plastic cover 62 couples under member 46 and against the inner portion of rear outer portion 66 to enclose member 46 in plastic that fits within the cavity of the vertical riser opening.

Although the present invention has been described in detail, it should be understood that various changes, substitutions and alterations can be made hereto without departing from the spirit and scope of the invention as defined by the appended claims.

What is claimed is:

1. An information handling system comprising:
    a housing;
    a processor disposed in the housing and operable to execute instructions to process information;
    a memory disposed in the housing and interfaced with the processor, the memory operable to store the instructions and information;
    a peripheral display interfaced with the processor and operable to present the information as visual images, the display coupled to a display stand having an opening; and
    a mount having a bracket coupled to the housing and a stand support coupled in the stand opening, the stand support extending a member at a bottom end into a cavity formed at a bottom surface of the opening, the stand support having a latch at a top end, the latch moving down to fit into the stand opening and biasing up and behind a side wall of the opening.

2. The information handling system of claim 1 wherein the member further comprises:
    a metallic arm; and
    a plastic fitting coupled to the metallic arm bottom surface.

3. The information handling system of claim 2 wherein the stand support further comprises:
    an insert portion sized to fit in the stand opening;
    a bracket brace coupled at a top end to the information handling system and extends below the stand opening at a bottom end to couple to the metallic arm.

4. The information handling system of claim 3 wherein the insert portion extends into the stand opening at a bottom side to cover the metallic arm.

5. The information handling system of claim 4 wherein the plastic fitting couples to the insert portion to enclose the metallic arm.

6. The information handling system of claim 1 further comprising:
    a catch coupled to the latch and aligned upward in the display stand opening; and
    a catch lip formed in the display stand opening aligned with the catch.

7. The information handling system of claim 6 further comprising a bracket brace having a metallic material extending from the bracket to terminate with a metallic arm below the display stand opening and having an opening aligned with the display stand opening.

8. The information handling system of claim 1 wherein the display stand further comprises:
    a base configured to rest on a support surface;
    a riser extending vertically up from the base to couple to the display; and
    an extended base coupled to a rear side of the base and extending under the information handling system housing.

9. The information handling system of claim 8 wherein the peripheral display couples to the bracket on a front side opposite the housing.

10. A method for coupling an information handling system to a display stand, the method comprising:

inserting a member of a mount in a bottom side of an opening of the display stand to engage with a cavity located within the opening;
engaging a latch of the mount in a top side of the opening of the display stand; and
coupling an information handling system housing to a bracket of the mount above the opening.

11. The method of claim 10 further comprising:
forming the bracket and member from one or more metallic sheets; and
enclosing the member in upper and lower plastic pieces sized to fit in the cavity.

12. The method of claim 11 further comprising:
biasing the latch upwards towards the bracket; and
pressing down on the latch to fit a catch of the latch under a catch lip of the display stand opening.

13. The method of claim 12 further comprising:
forming an opening in the one or more metallic sheets to align with the display stand opening; and
bending the one or more metallic sheets below the opening to form the member.

14. The method of claim 13 further comprising:
capturing the one or more metallic sheets between the latch on an outer side and a support on an inner side.

15. The method of claim 10 further comprising:
coupling an extended base to a base of the display stand; and
resting the base and extended base on a support surface to support the display stand.

16. The method of claim 15 further comprising coupling a display to the display stand on a side opposite the information handling system housing.

17. A display stand comprising:
a base configured to rest on support surface;
a riser extending up from the base and having a display bracket configured to couple to a display rear side, the riser having an opening; and
a mount having a housing bracket configured to couple to an information handling system housing and a stand support coupled in the riser opening, the stand support extending a member at a bottom end into a cavity formed at a bottom surface of the opening, the stand support having a latch at a top end, the latch moving down to fit into the stand opening and biasing up and behind a side wall of the opening.

18. The display stand of claim 17 wherein the member further comprises:
a metallic sheet disposed around the riser opening and bent to form a metallic arm extending into the riser opening; and
a plastic fitting coupled to the metallic arm bottom surface.

19. The display stand of claim 18 comprising an extended base coupled to a rear side of the base and extending under the housing bracket.

20. The display stand of claim 19 wherein the latch bias upward toward the housing bracket.

* * * * *